United States Patent
Beisiegel et al.

(10) Patent No.: US 7,810,108 B2
(45) Date of Patent: Oct. 5, 2010

(54) APPARATUS, SYSTEM, AND METHOD FOR SUPPORTING SERVICE COMPONENTS WRITTEN IN NON-NATIVE RUNTIME CODE IN A SERVICE COMPONENT ARCHITECTURE

(75) Inventors: Michael Beisiegel, Poughkeepsie, NY (US); Jean-Sebastien Michel Delfino, San Carlos, CA (US); Zhaohui Feng, Fremont, CA (US); Piotr Przybylski, San Carlos, CA (US)

(73) Assignee: International Business Machines Corporation, Armonk, NY (US)

( * ) Notice: Subject to any disclaimer, the term of this patent is extended or adjusted under 35 U.S.C. 154(b) by 1080 days.

(21) Appl. No.: 11/466,068

(22) Filed: Aug. 21, 2006

(65) Prior Publication Data

US 2008/0127236 A1    May 29, 2008

(51) Int. Cl.
*G06F 3/00*    (2006.01)
(52) U.S. Cl. ...................... 719/331; 719/318
(58) Field of Classification Search ........................ None
See application file for complete search history.

(56) References Cited

U.S. PATENT DOCUMENTS

| | | | |
|---|---|---|---|
| 6,779,030 B1 | 8/2004 | Dugan et al. | 709/223 |
| 2004/0049509 A1 | 3/2004 | Keller et al. | 707/100 |
| 2004/0054744 A1 * | 3/2004 | Karamchedu et al. | 709/206 |
| 2004/0117436 A1 | 6/2004 | Newman et al. | 709/203 |
| 2004/0221292 A1 * | 11/2004 | Chiang et al. | 719/310 |
| 2005/0160434 A1 * | 7/2005 | Tan et al. | 719/331 |

OTHER PUBLICATIONS

*A Goal-driven Approach to Enterprise Component Identification and Specification* Levi, K. et al.; 2002.
*An Innovation Design Approach to Build Virtual Environment* Oliveria, et al.; 2003.

* cited by examiner

*Primary Examiner*—Hyung S Sough
*Assistant Examiner*—Carina Yun
(74) *Attorney, Agent, or Firm*—Kunzler Needham Massey & Thorpe

(57) ABSTRACT

An apparatus, system, and method are disclosed for supporting service components written in non-native runtime code in a Service Component Architecture ("SCA"). A read module is included to read an implementation type definition having metadata identifying executable code that executes a new implementation type. A receive module is included to detect a dynamic service call to a service component having the new implementation type. The dynamic service call is defined in an SCA message from a calling SCA component. A passing module is included to pass the dynamic service call to a predefined SCA implementation handler associated with the new implementation type. The SCA implementation handler includes native runtime code and implementation logic for executing the dynamic service call by executing non-native runtime code that returns a result to the SCA implementation handler. A packaging module packages the result in an SCA return message to the calling SCA component.

16 Claims, 5 Drawing Sheets

APPARATUS, SYSTEM, AND METHOD FOR SUPPORTING SERVICE COMPONENTS WRITTEN IN NON-NATIVE RUNTIME CODE IN A SERVICE COMPONENT ARCHITECTURE

BACKGROUND OF THE INVENTION

1. Field of the Invention

This invention relates to servicing requests in a Service Component Architecture ("SCA") and more particularly relates to supporting SCA service requests to service components written in non-native runtime code.

2. Description of the Related Art

SCA is a protocol which describes a model for building applications and system using a Service-Oriented Architecture ("SOA"). SCA extends and compliments previous methods of implementing services and builds on open standards. SCA promotes an SOA organization of business application code based on components that implement business logic. The components offer services through service-oriented interfaces and make use of functions and services offered by other components through service references.

An application or program running on a client computer, server, or the like may desire to use a service made available by a component through a computer network such as the Internet, a wide area network, a local area network, or the like. An integration server, such as the WEBSPHERE® Process Server ("WPS") by International Business Machines ("IBM") of Armonk, New York may be used as an intermediary between a computer from which a service request originates and a computer hosting the desired service or function. Integration servers use a native programming code, such as JAVA® code.

Components written in the native code of the integration server may be accessed by the integration server to process service requests. Components written in non-native code, such as C, .NET Framework, Common Business Oriented Language ("COBOL"), and the like, present a compatibility problem for the integration server. Currently, components written in non-native code may be accessed if the components are compiled into a Common Object Request Broker Architecture ("CORBA") Object Request Broker ("ORB") or the like and used by an Internet Inter-Orb Protocol ("IIOP"). Using CORBA ORBs limits the use of non-native components.

Furthermore, current support for non-native components is not readily extendible. In particular the runtime software for current integration servers is limited to a predefined and compiled runtime "engine" which requires service components to be written and compiled into a native type of code, or support the IIOP protocol. The predefined and compiled runtime "engine" is not readily adaptable to accept service calls to executable code written and/or compiled into non-native code formats or languages.

From the foregoing discussion, it should be apparent that a need exists for an apparatus, system, and method that support, and are readily extendable to support, service components written in non-native runtime code in a Service Component Architecture. Beneficially, such an apparatus, system, and method would provide more flexibility in allowing access to non-native components than currently available solutions.

SUMMARY OF THE INVENTION

The present invention has been developed in response to the present state of the art, and in particular, in response to the problems and needs in the art that have not yet been fully solved by currently available methods to execute non-native runtime code of a service component. Accordingly, the present invention has been developed to provide an apparatus, system, and method for supporting service components written in non-native runtime code in a SCA that overcome many or all of the above-discussed shortcomings in the art.

A method of the present invention is also presented for supporting service components written in non-native runtime code in a Service Component Architecture. The method in the disclosed embodiments substantially includes the steps necessary to carry out the functions presented below with respect to the operation of the described apparatus and system. In one embodiment, the method includes reading an implementation type definition having metadata identifying executable code that executes a new implementation type. The implementation type definition satisfies an XML schema definition for an implementation handler. The method includes detecting a dynamic service call to a service component having the new implementation type. The dynamic service call is defined in an SCA message from a calling SCA component.

The method includes passing the dynamic service call to a predefined SCA implementation handler associated with the new implementation type. The SCA implementation handler includes native runtime code and implementation logic for executing the dynamic service call by executing non-native runtime code that returns a result to the SCA implementation handler. The method includes packaging the result in an SCA return message to the calling SCA component.

In one embodiment, the implementation type definition is defined using a Service Component Definition Language ("SCDL"). In another embodiment, the native runtime code is JAVA® code. In another embodiment, the non-native runtime code is derived from programming code selected from the group consisting of a Plain Old Java Object ("POJO"), .NET Framework, Business Process Execution Language ("BPEL"), C, C++, C#, Common Business Oriented Language ("COBOL"), Enterprise JAVABEANS® code ("EJB"), and Java Enterprise Edition ("J2EE"). In yet another embodiment, the SCA implementation handler includes object code compatible with the native runtime code.

In one embodiment, the method includes reading a qualifier header of the SCA message, the qualifier header referencing the new implementation type. In another embodiment, the method includes reading a qualifier header dynamically associated with the SCA message at runtime. In another embodiment, the SCA implementation handler is located with the service component. In yet another embodiment, the SCA implementation handler is located at a WEBSPHERE® Process Server.

The apparatus to support service components written in non-native runtime code in a Service Component Architecture is provided with a plurality of modules configured to functionally execute the necessary steps of reading an implementation type definition, receiving a dynamic service call, passing the call to an SCA implementation handler that returns results, and packaging the results in an SCA return message. These modules in the described embodiments include a read module that reads an implementation type definition having metadata identifying executable code that executes a new implementation type. The implementation type definition satisfies an XML schema definition for an implementation qualifier.

The apparatus includes a receive module that detects a dynamic service call to a service component having the new implementation type. The dynamic service call is defined in an SCA message from a calling SCA component. The apparatus includes a passing module that passes the dynamic service call to a predefined SCA implementation handler associated with the new implementation type. The SCA implementation handler includes native runtime code and implementation logic for executing the dynamic service call by executing non-native runtime code that returns a result to the SCA implementation handler.

The apparatus includes a packaging module that packages the result in an SCA return message to the calling SCA component. The apparatus, in one embodiment, includes a qualifier module configured to read a qualifier header of the dynamic service call. In another embodiment, the qualifier module reads a qualifier attached to the dynamic service call at runtime.

A system of the present invention is also presented to support service components written in non-native runtime code in a Service Component Architecture. The system may be embodied by a computer network, a service component, a calling SCA component, and an integration server in communication with the service component and the calling SCA component over the computer network. In particular, the integration server includes a read module that reads an implementation type definition having metadata identifying executable code that executes a new implementation type. The implementation type definition satisfies an XML schema definition for an implementation qualifier.

The integration server includes a receive module that detects a dynamic service call to the service component having the new implementation type. The dynamic service call is defined in an SCA message from the calling SCA component. The integration server includes a passing module that passes the dynamic service call to a predefined SCA implementation handler associated with the new implementation type. The SCA implementation handler includes native runtime code and implementation logic for executing the dynamic service call by executing non-native runtime code that returns a result to the SCA implementation handler. The integration server includes a packaging module that packages the result in an SCA return message to the calling SCA component. In one embodiment, the receiver module receives a dynamic service call from a client computer in communication with the integration server over the computer network.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
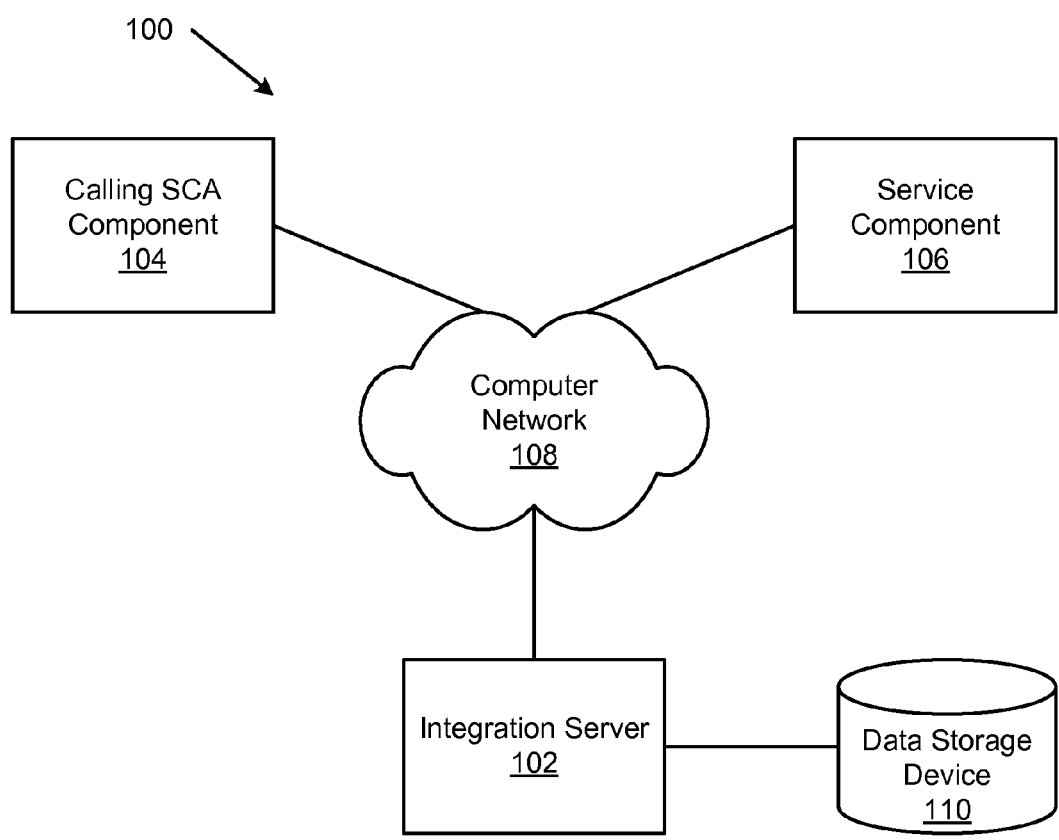
FIG. 1 is a schematic block diagram illustrating one embodiment of a system for supporting service components written in non-native runtime code in a SCA in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code maybe a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 depicts a system 100 for supporting service components written in non-native runtime code in a Service Component Architecture. The system 100, in one embodiment, includes an integration server 102, a calling SCA component 104, and a service component 106 connected through a computer network 108. The integration server 102 is in communication with a data storage device 110. The devices and components of the system 100 are described below.

The system 100 includes an integration server 102, also referred to as an application server or process server, in communication with the computer network 108. The integration server 102 facilitates communication over the Internet, or other network by relaying communications between computers. The integration server 102 may include one or more servers. Messages, communications, requests for service, and the like may be relayed through multiple integration servers 102 that form a middleware layer in a computer network 108. The integration server 102 may communicate with other integration servers 102, where each may run different native code. One of skill in the art will recognize other types of integration servers 102 or combinations of integration servers 102 capable of transmitting a message, request, or the like from one computer to another.

The system 100 includes a computer network 108 connecting the calling SCA component 104, the integration server 102, and the service component 106. The computer network 108 may include a local area network ("LAN"), a wide area network ("WAN"), the Internet, a storage area network ("SAN"), and the like and may be a combination of network types. The computer network 108 may include copper cables, optical fiber cables, hubs, switches, servers, such as the integration server 102, and other networking equipment capable of providing communication between a calling SCA component 104 and a service component 106.

The system 100 may also include a data storage device 110 in communication with the integration server 102. The data storage device 110 may be a hard disk drive, random access memory ("RAM"), an optical drive, flash memory, a tape drive, etc. The data storage device 110 may be internal or external to the integration server 102 and may be connected to the integration server 102 through cables directly or over a computer network 108. One of skill in the art will recognize other forms of data storage devices 110 accessible to an integration server 102.

Figure 2:
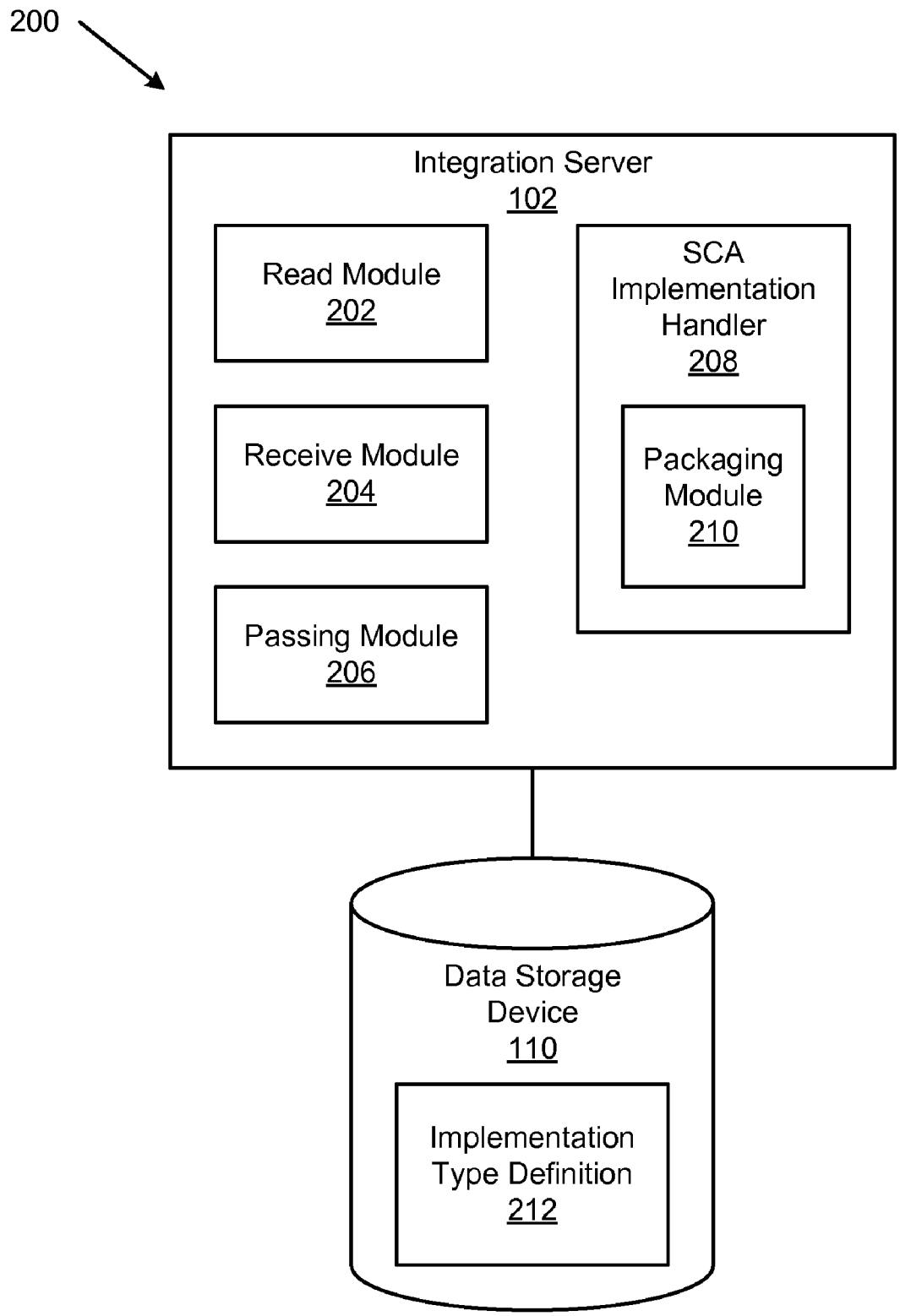
FIG. 2 is a schematic block diagram illustrating one embodiment of an apparatus for supporting service components written in non-native runtime code in a SCA in accordance with the present invention.

FIG. 2 depicts one embodiment of an apparatus 200 for supporting service components written in non-native runtime code in a SCA in accordance with the present invention. The apparatus 200 includes an integration server 102 that includes, in one embodiment, a read module 202, a receive module 204, a passing module 206, and an SCA implementation handler 208 with a packaging module 210, all of which are described below. The apparatus 200 may also include a data storage device 110 with an implementation type definition 212. The data storage device 110 is in communication with the integration server 102, which is explained below.

The apparatus 200 in one embodiment includes a read module 202 that reads an implementation type definition 212 having metadata identifying executable code that executes a new implementation type. By reading the implementation type definition 212 the read module 202 registers the SCA implementation handler 208 with the SCA runtime software. The implementation type definition 212 satisfies an extended markup language ("XML") schema definition for an implementation qualifier. The implementation type definition 212 is a defined, in one embodiment, using a Service Component Definition Language ("SCDL"). The SCDL is a text-based human readable and editable format which allows the apparatus 200 to be easily extended to support non-native components written in new or previously unsupported programming languages.

In one representative example of a SCA implementation handler 208 configured to provide implementation support for Plain Old Java Objects (POJOs) an implementation type definition 212 may be defined in one embodiment. The following shows how a POJO implementation handler 208 is registered with the SCA runtime, as an SCA component exported with a QualifierExportBinding. The qualifierType attribute on the QualifierExportBinding binds this handler to the SCDL model JavaImplementation type.

```
(<implementation xsi:type="java:JavaImplementation" javaClass="">).
  File my/sample/pojo/handler/MySimplisticPOJOHandler.component
  <?xml version="1.0" encoding="UTF-8"?>
  <scdl:component xmlns:xsi="http://www.w3.org/2001/XMLSchema-
  instance"
      xmlns:scdl="http://..."
      xmlns:java="http://..."
      name="my/sample/pojo/handler/MySimplisticPOJOHandler">
    <interfaces>
      <interface xsi:type="java:JavaInterface"
        interface="com.ibm.wsspi.sca.handler.MessageHandler"/>
    </interfaces>
    <implementation xsi:type="java:JavaImplementation"
        javaClass="my.sample.pojo.handler.MySimplisticPOJOHandler">
    </implementation>
  </scdl:component>
  File my/sample/pojo/handler/MySimplisticPOJOHandler.export
```

-continued

```
<?xml version="1.0" encoding="UTF-8"?>
<scdl:export xmlns:xsi="http://www.w3.org/2001/XMLSchema-
instance"
    xmlns:scdl="http://..."
    xmlns:java="http://..."
    xmlns:qualifier="http://.../extensions..."
    name="my/sample/pojo/handler/MySimplisticPOJOHandler"
    component="my/sample/pojo/handler/MySimplisticPOJOHandler">
    <interfaces>
        <interface xsi:type="java:JavaInterface"
            interface="com.ibm.wsspi.sca.handler.MessageHandler"/>
    </interfaces>
    <esbBinding xsi:type="ext:ImplementationExtension"
        implementationType="java:JavaImplementation"
        extensionPoint="....extensions/ImplementationGroup2"/>
</scdl:export>
        Software Sample #1
```

An implementation type definition 212 typically includes metadata. The metadata points to executable code of an implementation type for a component. For example, if a component is written in JAVA® code, the metadata of the implementation type definition 212 indicates where the JAVA® code is located to execute the component code. Depending on the type of implementation the metadata included in the implementation type definition 212 can vary considerably. For example in implementations that support scripting languages the metadata may include the location of a scripting engine that is to be invoked or provided with a particular script to service the dynamic service call.

In one embodiment, the implementation type definition 212 includes metadata that identifies executable code for a new implementation type not previously registered with the integration server 102. For example, if an implementation type of BPEL has not been registered with the integration server 102, the metadata of the implementation type definition 212 may identify executable code for the BPEL so that service components 106 written in BPEL are accessible to the integration server 102. The implementation type definition 212 advantageously points to executable code of any number of legacy or new types of programming code. The implementation type definition 212 facilitates access to service components 106 without requiring the components to be compiled into a CORBA ORB or other IIOP compliant code.

In one embodiment, the read module 202 reads the implementation type definition 212 to register it with the integration server 102 during initialization. In another embodiment, the read module 202 reads the implementation type definition 212 to register it with the integration server 102 while the integration server 102 is running. Registering the implementation type definition 212 while the integration server 102 is running is advantageous because the integration server 102 does not have to be shut down to register a new implementation type. One of skill in the art will recognize other ways for the read module 202 to read an implementation type definition 212 of a new implementation type to allow access to a service component written in non-native code.

The apparatus 200 includes a receive module 204 that detects a dynamic service call to a service component 106 having the new implementation type. The dynamic service call may be defined in an SCA message from the calling SCA component 104. In one embodiment, the dynamic service call is received from a computer with an application that is seeking to access a function or service of the service component where the component is of the new implementation type. A dynamic service call may be defined in an SCA message. The SCA message typically includes the name of the service component 106 providing a service, but may also include a description, address, or other identifier of the service component 106.

The receive module 204 may detect a dynamic service call through the computer network 108. The receive module 204 may detect a dynamic service call sent directly from a calling SCA component 104 or indirectly through another integration server 106. The dynamic service call may be a single SCA message or may be combined with other SCA messages. The dynamic service call may be also be nested within an SCA message.

The dynamic service call may also be invoked by another service component 106 seeking a function or service necessary for completion of a higher level service request. For example, service component A may be accessed to complete an order for a customer. Service component A may send an SCA service call to service component B to verify that the ordered part is available and to service component C to retrieve customer information. If service component C is of a new implementation type and the read module 202 reads an implementation type definition 212 corresponding to the new implementation type, service component C may provide the customer information for service component A. One of skill in the art will recognize other ways for the receive module 204 to detect a dynamic service call.

The apparatus 200 includes a passing module 206 that passes the dynamic service call to a predefined SCA implementation handler 208 associated with the new implementation type. The SCA implementation handler 208 includes native runtime code and implementation logic for executing the dynamic service call by executing non-native runtime code that returns a result to the SCA implementation handler 208. For example, if the native code for the integration server 102 is JAVA® code and the service component 106 with non-native code related to the SCA implementation handler 208 is BPEL code, the SCA implementation handler 208 includes JAVA® code as well as implementation logic to interpret the dynamic service call to the service component 106 and to then execute the BPEL code, non-native runtime code of a service component 106 to respond to the dynamic service call.

The passing module 206, in one embodiment, passes a dynamic service call from a calling SCA component 104 that may comprise a computer running an application. In another embodiment, the passing module 206 passes a dynamic service call from another service component 106. In another embodiment, the passing module 206 interprets a dynamic service call to require service from more than one service component 106 and passes the dynamic service call to the corresponding SCA implementation handlers 208 of the new implementation types associated with the service components 106 identified in the dynamic service call. One of skill in the art will recognize other ways that the passing module 206 may pass a dynamic service call to an SCA implementation handler 208.

The SCA implementation handler 208, in one embodiment, is located with the integration server 102. In another embodiment, the SCA implementation handler 208 is located with the associated service component 106. In yet another embodiment, the SCA implementation handler 208 is located away from the integration server 102 and the associated service component 106 but is accessible from the integration server 102. Where the SCA implementation handler 208 is located separate from the integration server 102, the implementation type definition 212 may indicate an address or pathway to the SCA implementation handler 208. One of skill in the art will recognize other locations for the SCA implementation handler 208 and ways for the integration server 102 to access the SCA implementation handler 208.

The SCA implementation handler 208 provides the runtime support for a particular component implementation type (for example JAVA® component implementations, BPEL component implementations, C++, etc.). The SCA implementation handler 208 typically includes native code of the integration server 102 to be compatible with the integration server 102. In addition, the SCA implementation handler 208 typically includes implementation logic or instructions to execute non-native code of a service component 106 comprising a new implementation type. The non-native runtime code may be derived from programming code for the new implementation type such as Plain Old Java Object ("POJO"), .NET Framework, Business Process Execution Language ("BPEL"), C, C++, C#, Common Business Oriented Language ("COBOL"), Enterprise JAVABEANS® code ("EJB), Java Enterprise Edition ("J2EE"), and the like. The SCA implementation handler 208 includes object code compatible with the native runtime code.

The implementation logic of the SCA implementation handler 208 may reference the metadata of the implementation type definition 212 to identify a location of code for execution of the runtime code of the service component 106 with a new implementation type. Once the execution code is identified, typically the SCA implementation handler 208 executes the code of the service component 106 as requested in the SCA message of the dynamic service call. In one embodiment, this means the implementation handler 208 locates the service component 106 and executes one or more methods or functions of the service component 106.

The SCA implementation handler 208 includes, in one embodiment, a packaging module 210 that packages the result in an SCA return message to the calling SCA component 104. The return SCA message includes results from the execution of the non-native code of the service component 106 by the SCA implementation handler 208. The results are typically in a form to be SCA compliant in a form acceptable to the calling SCA component 104. For example, the results may comprise standard Service Data Objects (SDOs). The results may then be used by the calling SCA component 106 to produce results to be passed on to another calling SCA component 104 or may be the end product sought by a calling SCA component 104 and presented to a user.

In one embodiment, the packaging module 210 packages results from one service component 106. In another embodiment, the packaging module 210 packages results from more than one service component 106. In yet another embodiment, the dynamic service call includes calls to more than one service component 106 and an SCA implementation handler 208 for each called service component 106 includes a packaging module 210 and each packaging module 210 packages results from its corresponding service component 106. The integration server 102 then passes the results on to the calling SCA component 104. One of skill in the art will recognize other ways for a packaging module 210 to package results in an SCA return message to the calling SCA component 104. In accordance with the representative example for supporting a POJO implementation handler 208, a representative example embodiment is described using the following example code for writing the POJO implementation handler 208. The POJO implementation handler 208 can be registered with the JavaImplementation implementation type, it will then be invoked to handle the interaction with POJO component implementations. For simplicity here the sample POJO implementation handler 208 handles methods with a single parameter. Those of skill in that art understand that handling of multiple parameters would require some logic to build an array of parameters from the properties of the SDO DataObject representing the body of the SCA message.

The sample POJO implementation handler 208 does the following:

It navigates the SCDL logical model to get the model object describing the component implementation.

Then it gets the POJO class name from the JavaImplementation model object, and instantiates it, then finds the target method on the POJO;

It invokes the target POJO method

Finally the handler returns a Response or Exception message with the results of the invocation.

The sample source code for the sample POJO component implementation handler 208 is as follows.

```
package my.sample.pojo.handler;
import java.lang.reflect.Method;
// This is the SCDL model interface representing a Java component
// implementation used in <implementation
xsi:type="java:JavaImplementation" javaClass="..."/>
import ....java.JavaImplementation;
import ...handler.MessageHandler;
import ...message. Message;
import ...message. MessageType;
import ...container. Container;
public class MySimplisticPOJOHandler implements MessageHandler {
  /** * Constructor */
  public JavaImplementationHandler( ) {
    super( ); }
  /** * @see.MessageHandler#processMessage(.message. Message) */
  public Message processMessage(Message message) {
    try { // Get the SCA header describing the current interaction
    InteractionHeader interaction = (InteractionHeader)
message.getHeader(InteractionHeader.HEADER_NAME);
    // Get the current component implementation
    Component component =
        (Component) interaction.getTargetPort( ).getPart( );
    JavaImplementation javaImplementation =
        (JavaImplementation) component.getImplementation( );
    // Create an instance of the POJO
      String className = javaImplementation.getJavaClass( );
      Class clazz = Class.forName(className);
      Object pojo=clazz.newInstance( );
    // Get the specified method on the target POJO
    // For the purpose of the sample, we simply ignore method signatures
    // and just look for a method with the correct name
      String methodName = message.getMethodName( );
      Method[ ] methods=clazz.getMethods( );
      Method method = null;
      for (int i=0; i<methods.length; i++) {
        if (methodName.equals(methods[i].getName( ))) {
          method=methods[i];
        break;}}
      if (method==null)
        throw new NoSuchMethodException(methodName);
    // Invoke the target method using reflection
      Object[ ] arguments = new Object[message.getBody( )];
      Object result = method.invoke(pojo, arguments);
    // Initialize the response message
    // Note: one could also create a new message from scratch, but
    // reusing the message that was passed in is simpler.
      interactionHeader.setMessageType(MessageType.RESPONSE);
      message.setBody(result);
      return message;
    } catch (Exception e) {
    // Return an exception message
    interactionHeader.setMessageType(MessageType.EXCEPTION);
      message.setBody(e);
      return message;
  }   }}
      Software Sample #2
```

Figure 3:
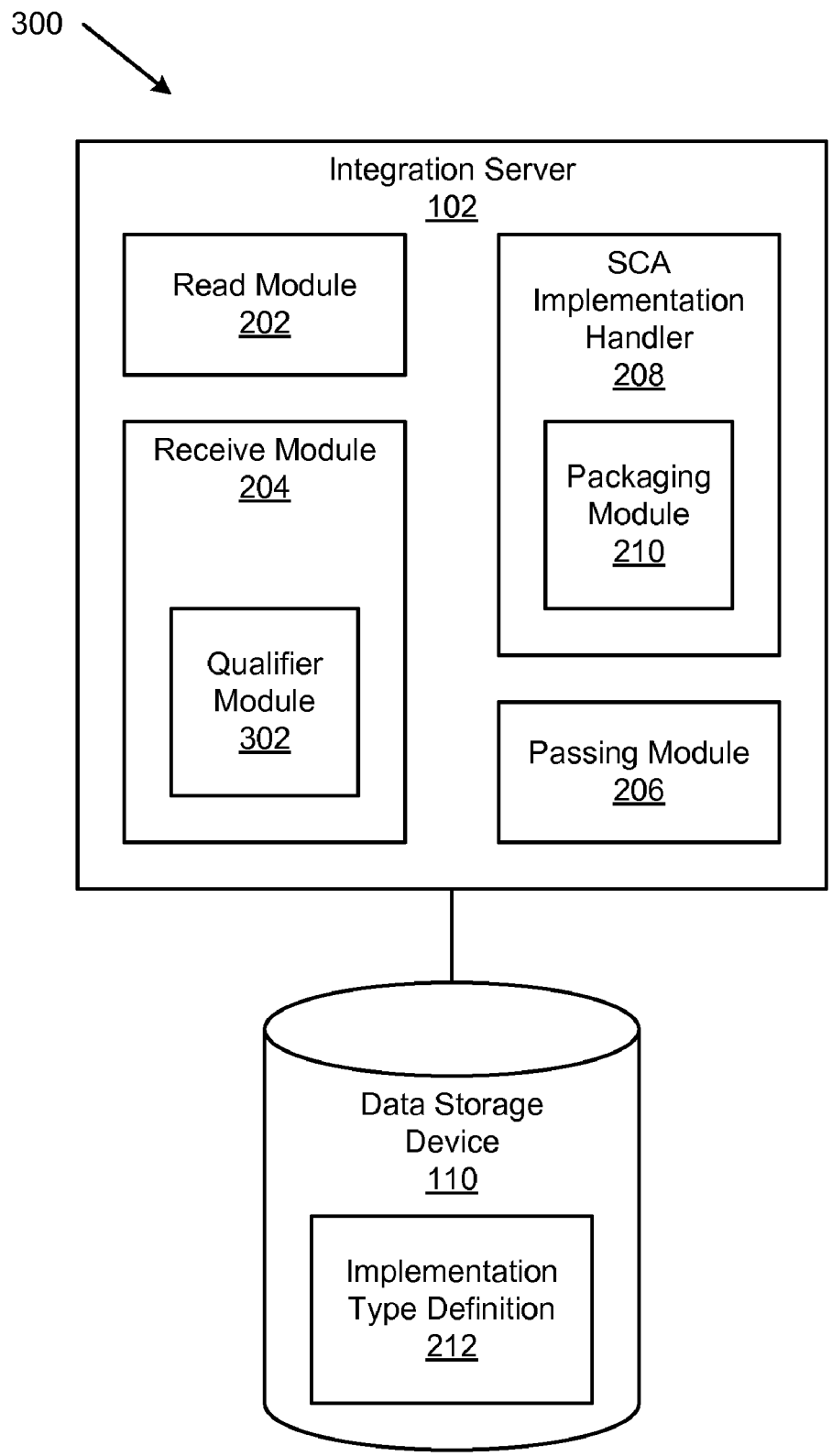
FIG. 3 is a schematic block diagram illustrating another embodiment of an apparatus for supporting service components written in non-native runtime code in a SCA in accordance with the present invention.

FIG. 3 depicts another apparatus 300 for supporting service components written in non-native runtime code in a SCA in accordance with the present invention. The apparatus 300 includes an integration server 102 with a read module 202, a receive module 204, a passing module 206, and an SCA implementation handler 208 with a packaging module 210 substantially similar as described in relation to the apparatus 200 of FIG. 2. In addition, the apparatus 300 includes a data storage device 110 with an implementation type definition 212 substantially similar as described in relation to the apparatus 200 of FIG. 2.

In addition, the receive module 204 includes a qualifier module 302 that reads a qualifier header of the SCA message. The qualifier header may reference the new implementation type or service component 106. In addition, the qualifier module 302 may read a qualifier header that is dynamically associated with the SCA message at runtime. A qualifier may include instructions for handling the SCA message and results requested by the SCA message to comply with a desired quality of service ("QOS").

A qualifier may dictate priority of the SCA message, guaranteed once only delivery requirements, required response, time out requirements, etc. A qualifier may originate at the calling SCA component 104 and be attached in the header of the SCA message or may be dynamically attached by an integration server 102 or other component of the computer network 108 at run time. The integration server 102, through the receive module 204, may respond to the qualifier by raising or lowering a priority associated with processing the SCA message and corresponding results or by invoking appropriate handling messages, timeout messages, error message, and the like. One of skill in the art will recognize other ways that the receive module 204 may read and respond to a qualifier in the header of an SCA message.

Advantageously, the apparatus 300 provides a convenient way to execute non-native runtime code of a service component 106 written in a new implementation type. The apparatus 300 allows execution of non-native runtime code of a service component 106 without a requirement for compiling the service component into a CORBA ORB. The apparatus 300 furthers compatibility of SCA components with legacy services and functions as well as service components written in a new programming language.

Figure 4:
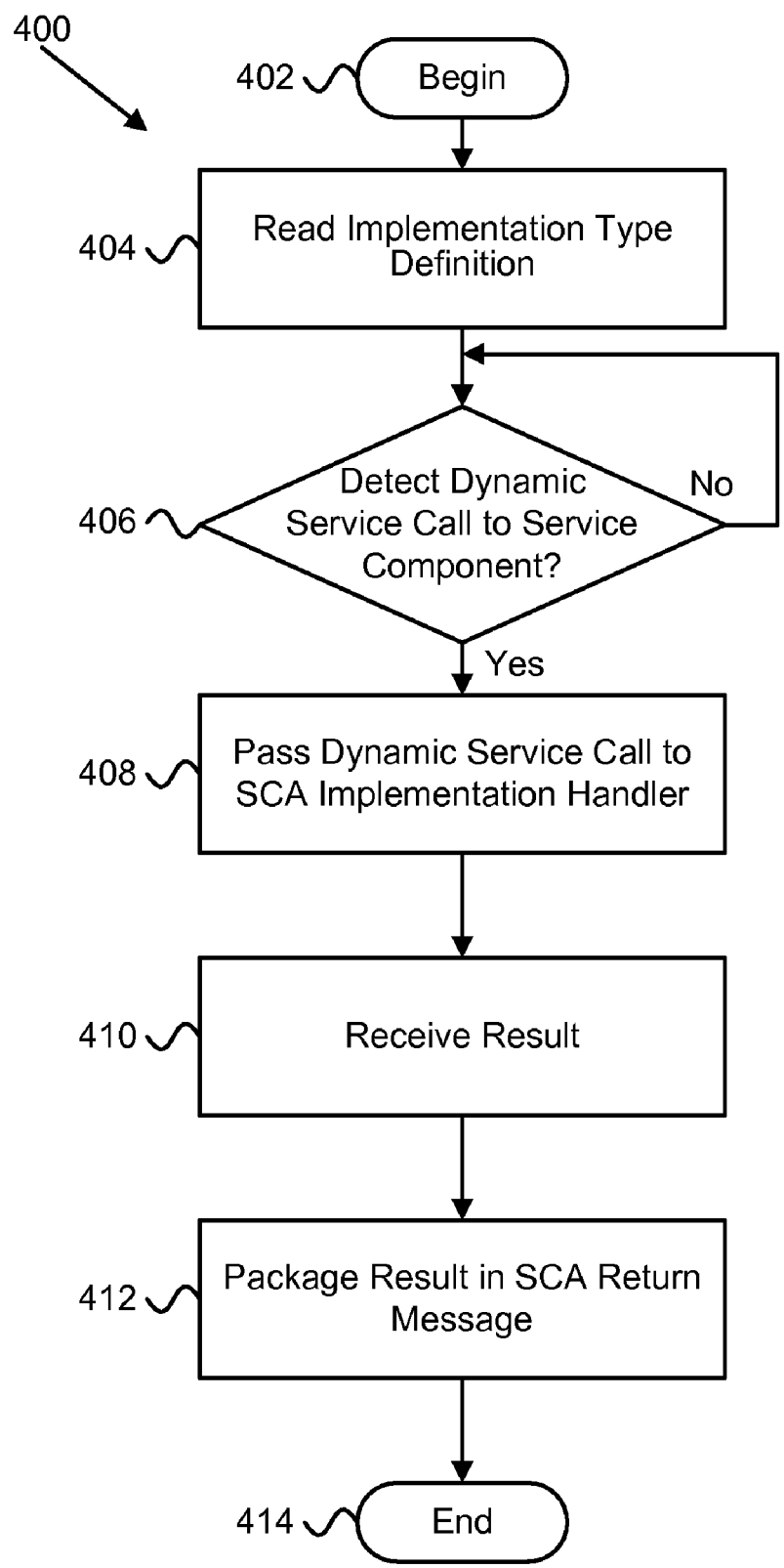
FIG. 4 is a schematic flow chart diagram illustrating one embodiment of a method for supporting service components written in non-native runtime code in a SCA in accordance with the present invention.

FIG. 4 is a schematic flow chart diagram illustrating one embodiment of a method 400 for supporting service components written in non-native runtime code in a Service Component Architecture in accordance with the present invention. The method 400 begins 402 and the read module 202 reads 404 an implementation type definition 212 typically located in a data storage device 110 connected to an integration server 102. The implementation type definition 212 includes metadata identifying executable code that executes a new implementation type. The implementation type definition 212 also satisfies an XML schema definition for an implementation qualifier. The new implementation type typically includes a programming language not previously executable by the integration server 102. The read module 202 may read 404 the implementation type definition 212 at initialization or while running.

The receive module 204 determines 406 when a dynamic service call to a service component 106 having the new implementation type is detected. If the receive module 204 determines 406 that a dynamic service call has not been detected, the receive module 204 continues to wait for a dynamic service call. The dynamic service call is defined in an SCA message from the calling SCA component 104.

If the receive module 204 determines 406 that a dynamic service call has been detected, the passing module 206 passes 408 the dynamic service call to a predefined SCA implementation handler 208 associated with the new implementation type. In one embodiment, the SCA implementation handler 208 is associated with a specific service component 106 written in the new implementation type. In another embodiment, the SCA implementation handler 208 may be associated with any service component 106 written in the new implementation type. The SCA implementation handler 208 includes native runtime code of the integration server 102. In addition, the SCA implementation handler 208 includes implementation logic for executing the dynamic service call by executing non-native runtime code that returns a result from the service component 106 to the SCA implementation handler 208.

The SCA implementation handler 208 receives 410 the result from the service component 106. The packaging module 210 packages 412 the result from the service component 106 in an SCA return message and the method 400 ends 414. The packaging module 210 may package 412 results from more than one service component 106 if more than one service is invoked by the dynamic service call.

Figure 5:
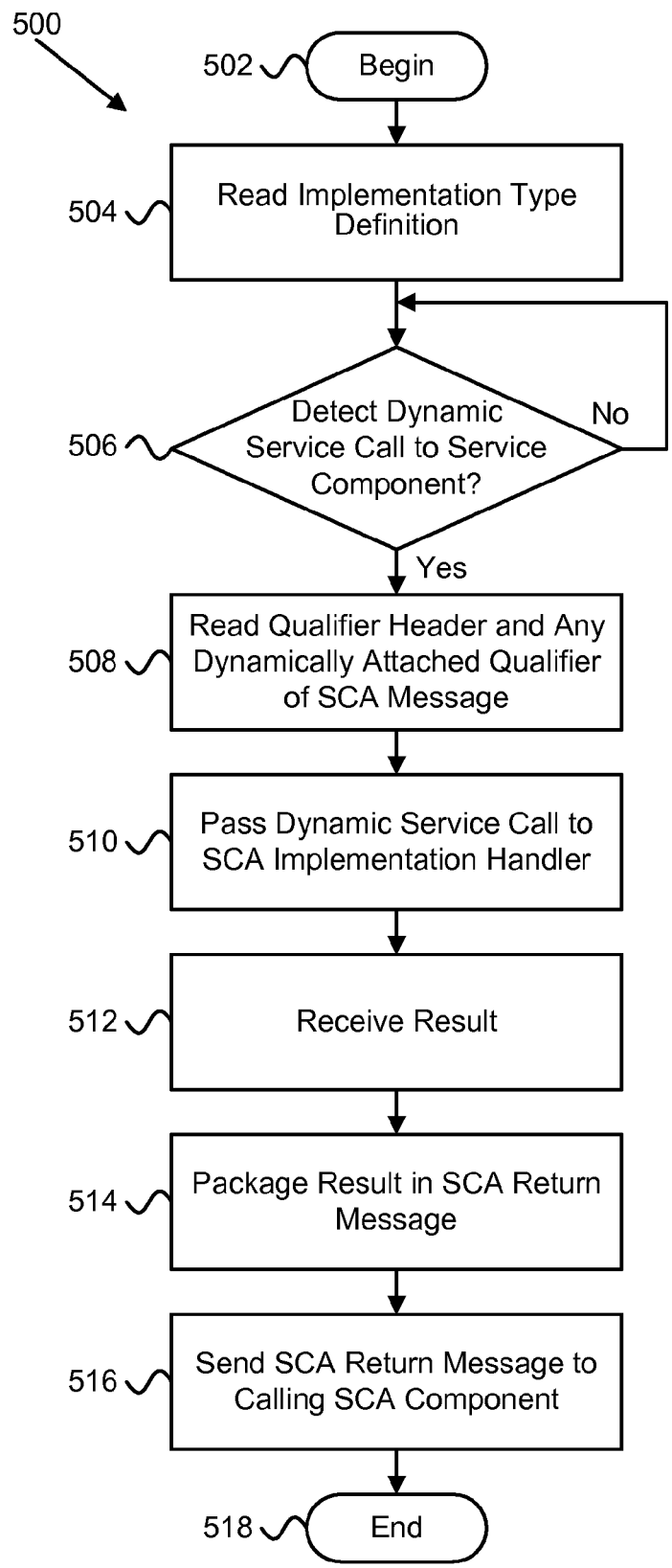
FIG. 5 is a schematic flow chart diagram illustrating another embodiment of a method for supporting service components written in non-native runtime code in a SCA in accordance with the present invention.

FIG. 5 is a schematic flow chart diagram illustrating another embodiment of a method 500 for supporting service components written in non-native runtime code in a SCA in accordance with the present invention. The method 500 begins 502 and the read module 202 reads 504 an implementation type definition 212 typically located in a data storage device 110 connected to an integration server 102.

The receive module 204 determines 506 when a dynamic service call to a service component 106 having the new implementation type is detected. If the receive module 204 determines 506 that a dynamic service call has not been detected, the receive module 204 continues to wait for a dynamic service call.

If the receive module 204 determines 506 that a dynamic service call has been detected, the qualifier module 302 reads 508 a qualifier header in the SCA message and any qualifier header dynamically attached to the SCA message. The passing module 206 passes 510 the dynamic service call to a predefined SCA implementation handler 208 associated with the new implementation type. The SCA implementation handler 208 executes the non-native runtime code of the service component 106. The SCA implementation handler 208 receives 512 the result from the service component 106. The packaging module 210 packages 514 the result from the service component 106 in an SCA return message. The integration server 102 sends 516 the SCA return message to the calling SCA component 104 and the method 500 ends 518.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a tangible, non-transitory computer readable storage medium storing computer usable program code programmed for supporting service components written in non-native runtime code in a Service Component Architecture ("SCA"), the operations of the computer program product comprising:

reading an implementation type definition having metadata identifying runtime executable code that is non-native to an integration server and that executes a new implementation type, the implementation type definition satisfying an XML schema definition for an implementation qualifier and defined using a Service Component Definition Language ("SCDL") of the SCA;

detecting a dynamic service call to a service component having the new implementation type, the dynamic service call defined in an SCA message from a calling SCA component;

reading a qualifier header of the SCA message, the qualifier header referencing the new implementation type;

passing the dynamic service call to a SCA implementation handler, the SCA implementation handler comprising native runtime code and implementation logic for referencing the non-native runtime executable code identified by the metadata and executing the dynamic service call by executing non-native runtime code that returns a result to the SCA implementation handler; and packaging the result in an SCA return message to the calling SCA component.

2. The computer program product of claim 1, wherein the native runtime code is JAVA®code.

3. The computer program product of claim 1, wherein the non-native runtime code is derived from programming code selected from the group consisting of Plain Old Java Object ("POJO"), Business Process Execution Language ("BPEL"), C, C++, C#, Common Business Oriented Language ("COBOL"), and Enterprise JAVABEANS® code ("EJB").

4. The computer program product of claim 1, wherein the SCA implementation handler comprises object code compatible with the native runtime code.

5. The computer program product of claim 1, further comprising reading a qualifier header dynamically associated with the SCA message at runtime.

6. The computer program product of claim 1, wherein the SCA implementation handler is located with the service component.

7. The computer program product of claim 1, wherein the SCA implementation handler is located at a Process Server.

8. An apparatus to support service components written in non-native runtime code in a Service Component Architecture ("SCA"), the apparatus comprising:

a tangible, non-transitory computer readable storage medium storing computer usable program code;

a processor executing the computer useable program code, the computer useable program code comprising a read module reading an implementation type definition having metadata identifying runtime executable code that is non-native to an integration server and that executes a new implementation type, the implementation type definition satisfying an XML schema definition for an implementation qualifier and defined using a SCDL of the SCA;

a receive module detecting a dynamic service call to a service component having the new implementation type, the dynamic service call defined in an SCA message from a calling SCA component;

a qualifier module reading a qualifier header of the SCA message, the qualifier header referencing the new implementation type:

a passing module passing the dynamic service call to a SCA implementation handler, the SCA implementation handler comprising native runtime code and implementation logic for referencing the non-native runtime executable code identified by the metadata and executing the dynamic service call by executing non-native runtime code that returns a result to the SCA implementation handler; and a packaging module packaging the result in an SCA return message to the calling SCA component.

9. The apparatus of claim 8, wherein the native runtime code is Java ®code.

10. The apparatus of claim 8, wherein the SCA implementation handler comprises object code compatible with the native runtime code.

11. The apparatus of claim 8, the qualifier module further reading a qualifier attached to the dynamic service call at runtime.

12. The apparatus of claim 8, wherein the SCA implementation handler is located with the service component.

13. The apparatus of claim 8, wherein the SCA implementation handler is located at a Process Server.

14. A system to support service components written in non-native runtime code in a Service Component Architecture ("SCA"), the system comprising:

a computer network;

a service component;

a calling SCA component; and an integration server in communication with the service component and the calling SCA component over the computer network, the integration server comprising a read module reading an implementation type definition having metadata identifying runtime executable code that executes a new implementation type, the implementation type definition satisfying an XML schema definition for an implementation qualifier and defined using a SCDL of the SCA;

a receive module detecting a dynamic service call to the service component having the new implementation type, the dynamic service call defined in an SCA message from the calling SCA component;

a qualifier module reading a qualifier header of the SCA message. the qualifier header referencing the new implementation type;

a passing module passing the dynamic service call to a SCA implementation handler the SCA implementation handler comprising native runtime code and implementation logic for referencing the non-native runtime executable code identified by the metadata and executing the dynamic service call by executing non-native runtime code that returns a result to the SCA implementation handler; and a packaging module packaging the result in an SCA return message to the calling SCA component.

15. The system of claim 14, wherein the integration server is a Process Server.

16. The system of claim 14, wherein the receiver module receives a dynamic service call from a client computer in communication with the integration server over the computer network.

* * * * *